United States Patent Office 3,476,752
Patented Nov. 4, 1969

3,476,752
4-SUBSTITUTED-2,3-BENZOXAZINES
Giorgio Pifferi, Milan, Italy, and Emilio Testa, Vacallo, Tessin, Switzerland, assignors to Lepetit S.p.A., Milan, Italy
No Drawing. Filed Mar. 15, 1967, Ser. No. 623,226
Claims priority, application Great Britain, Mar. 17, 1966, 11,794
Int. Cl. C07d 87/04, 87/12
U.S. Cl. 260—244                                4 Claims

ABSTRACT OF THE DISCLOSURE

A new class of compounds having pharmacological properties is described. More particularly, the compounds are 4-substituted-2,3-benzoxazines which have proved to be useful as hypotensive, myorelaxant and anti-inflammatory agents. A method for preparing them from the corresponding 4-halo-2,3-benzoxazines is also described.

---

This invention relates to a new class of compounds and to a method for preparing them.

More particularly, the compounds with which the invention is concerned are represented by the general formula:

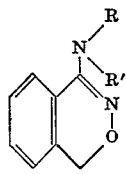

wherein R is a member of the class consisting of hydrogen and lower alkyl, R' is a member of the class consisting of hydrogen, lower alkyl, dialkylaminoalkyl, optionally substituted aryl and the —NHR" group, wherein R" is selected from hydrogen and lower alkyl, R and R' taken together with nitrogen form a heterocyclic ring.

The process consists in heating at a temperature between 70 and 150° C. a mixture of a 4-halogen-1H-2,3-benzoxazine of the formula:

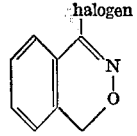

and a compound NHRR', wherein R and R' have the same significance as above indicated. Although the reaction usually takes place with about equimolecular amounts of the two reactants, it is preferred to use a more or less important excess of the second reactant, i.e. of NHRR'. According to the nature of the starting compounds it may be sometimes convenient to dissolve them in a small quantity of an organic solvent, such as a lower alkanol; in this case the reaction temperature is the reflux temperature of the mixture.

The time necessary for the reaction to be completed is generally between about 0.5 and 3 hours, and all the products are usually obtained in good yields.

The above outlined process is the preferred one. Other obvious variants are workable and are within the usual skillfulness of an average technician. Among these we cite as an example the one consisting in reacting the starting compound with a phenol in the presence of potassium hydroxide, and heating successively the phenoxyderivative with ammonium acetate.

The compounds have interesting pharmacological properties as hypotensive, myorelaxant (muscle relaxant), antiinflammatory and sedative agents. For instance 4-hydrazino-1H-2,3-benzoxazine and 4-diethylamino-1H-2,3-benzoxazine were observed to cause a marked decrease of blood pressure, from 60 to 120 mm. Hg, when injected intravenously in dogs, at doses of 0.5–5 mg./kg. 4-methylamino-1H-2,3-benzoxazine was found to be active as an antiinflammatory agent in the carrageenin edema test; when administered orally at doses of 50, 20, 10 mg./kg., it produced decrease of edema respectively of −37%, −22%, −9%. 4-dimethylamino-2,3-benzoxazine was observed to decrease skeletal muscle tone in mice in a degree comparatively higher than meprobamate.

They may be used in pharmaceutical compositions, like tablets and ampoules for injection, at doses of 10–100 mg. orally, and of 10–40 mg. i.v. or i.m.

EXAMPLE 1

Preparation of 4-butylamino-1H-2,3-benzoxazine

An amount of 2.52 g. of 4-chloro-1H-2,3-benzoxazine is heated for 3 hours in a sealed tube at 140° C. with 10 ml. of butylamine. The mixture is allowed to cool down, then the excess of butylamine is removed in vacuo, the residue is taken up with diethyl ether and the solution is extracted with dilute HCl, thus obtaining a solution which is made alkaline and then again extracted with diethyl ether. This solution is washed with $H_2O$, then dried and the solvent is distilled off. The residue is crystallised from diisopropyl ether, thus obtaining 2.2 g. (yield 71.8%) of the substance with M.P. 62.5–63.5° C.

EXAMPLES 2–7

According to the method of Example 1 the following derivatives were prepared:

| Substituents | | Yield | M.P. | B.P. |
|---|---|---|---|---|
| R | R₁ | | | |
| H | CH₃ | 86.3 | 149–150° C. | |
| H | –⟨phenyl with CH₃ CH₃⟩ | 70 | 188–189.5° C. | |
| H | —CH₂—CH₂N(C₂H₅)₂ | 75 | | 190/0.9 mm. Hg |
| CH₃ | CH₃ | 80 | | 105/0.5 mm. Hg |
| | —N⟨morpholine⟩O | 68 | 110–111° C. | |
| | —N⟨piperazine⟩N—CH₃ | 69 | 89–90° C. | |

EXAMPLE 8

Preparation of 4-amino-1H-2,3-benzoxazine

An amount of 40 g. of 4-chloro-1H-2,3-benzoxazine is added to a solution of 23.7 g. of finely powdered potassium hydroxide in 170 g. of phenol. The mixture is heated on an oil-bath at 130° C. for 4 hours, then it is cooled down to 30° C. and poured into 750 ml. of 10% aqueous sodium hydroxide.

This solution is extracted with diethyl ether and the solvent is distilled off. The oily residue is dissolved in 40 ml. of diisopropyl ether and allowed to stand for 18 hours in ice. The precipitate is collected and dried in vacuo at room temperature. Yield 35.2 g. (76%); M.P. 73–74° C.

An amount of 5 g. of 4-phenoxy-1H-2,3-benzoxazine is added to 30 g. of ammonium acetate heated at 120° C. until completely molten. The temperature is raised to 150° C., and the mixture is stirred at such temperature for 30 minutes. The excess of ammonium acetate is removed by distillation in vacuo on a water bath, then the residue is taken up with 15 ml. of water and the mixture is made basic with 50% aqueous NaOH. An oil separates which can be solidified by cooling in ice.

The crude product is collected and dried at 50° on a water bath, then it is taken up with 15 ml. of diethyl ether and the solution is refluxed. Then the mixture is cooled in ice; the solvent is distilled off. Yield 2 g. (60%) of the substance with M.P. 134–136° C. The 4-amino-1H-2,3-benzoxazine hydrochloride is obtained by precipitation from an ethanol solution of the free base on adding hydrogen cloride in ethanol.

EXAMPLE 9

Preparation of 4-hydrazino-1H-2,3-benzoxazine

To a solution of 0.5 g. of 4-chloro-1H-2,3-benzoxazine in 5 ml. of ethanol, 0.75 ml, of hydrazine hydrate are added, and the mixture is refluxed for 30 minutes, then it is allowed to cool down at room temperature, and acidified with hydrogen chloride dissolved in ethanol. The precipitate, which is hydrazine hydrochloride, is discarded, and the filtrate is concentrated in vacuo at low temperature. The residue is dissolved in diethyl ether and rested in ice. The precipitate thus obtained is collected and recrystallised from isopropanol. Yield 0,.40 g. (65%) of 4-hydrazino-1H-2,3-benzoxazine hydrochloride; M.P. 138–141° C. The free base can be obtained as usual.

EXAMPLE 10

Preparation of 4-(2-methylhydrazino)-1H-2,3-benzoxazine

To 2 g. of 4-chloro-1H-2,3-benzoxazine dissolved in 10 ml. of ethanol, 1.66 g. of methylhydrazine are added, and the resulting mixture is refluxed for 40 minutes. The solvent is removed in vacuo at the temperature of 40° C. and the residue is taken up with anhydrous diethyl ether, separated from the insolube oil and filtered; then the solvent is distilled off and the compound is recrystallised from diisopropyl ether. Yield 1.15 g. (60%); M.P. 94–96° C.

We claim:

1. A compound of the formula wherein R is a member of the class consisting of hydrogen and lower alkyl, R' is a member of the class consisting of hydrogen, lower alkyl, di-lower alkylamino-lower alkyl, 2,3-xylyl and the —NHR'' group, wherein R'' is selected from the class consisting of hydrogen and lower alkyl, R and R' taken together with nitrogen form a heterocyclic ring selected from the group consisting of morpholino and 4-methyl-piperazino.

2. A compound as in claim 1, having the formula

3., A compound as in claim 1 having the formula

4. A compound as in claim 1 having the formula

References Cited

UNITED STATES PATENTS

| | | | |
|---|---|---|---|
| 2,650,919 | 9/1953 | Cusic | 260—244 |
| 3,058,980 | 10/1962 | Berg | 260—244 |

OTHER REFERENCES

Griffiths et al.: Jour. Chem. Soc. (London) vol. 127, pp. 1698–708 (1925).

Migridichian Organic Synthesis: vol. 1, pp. 465–8, N.Y., Reinhold, 1957.

Mustafa et al.: Jour. Amer. Chem. Soc., vol. 77, pp. 1612–5 (1955).

HENRY R. JILES, Primary Examiner

N. TROUSOF, Assistant Examiner

U.S. Cl. X.R,

260—247.5, 999